R. L. WILCOX.
METHOD FOR FORMING NUTS.
APPLICATION FILED NOV. 7, 1918. RENEWED MAY 27, 1921.
1,408,917.
Patented Mar. 7, 1922.
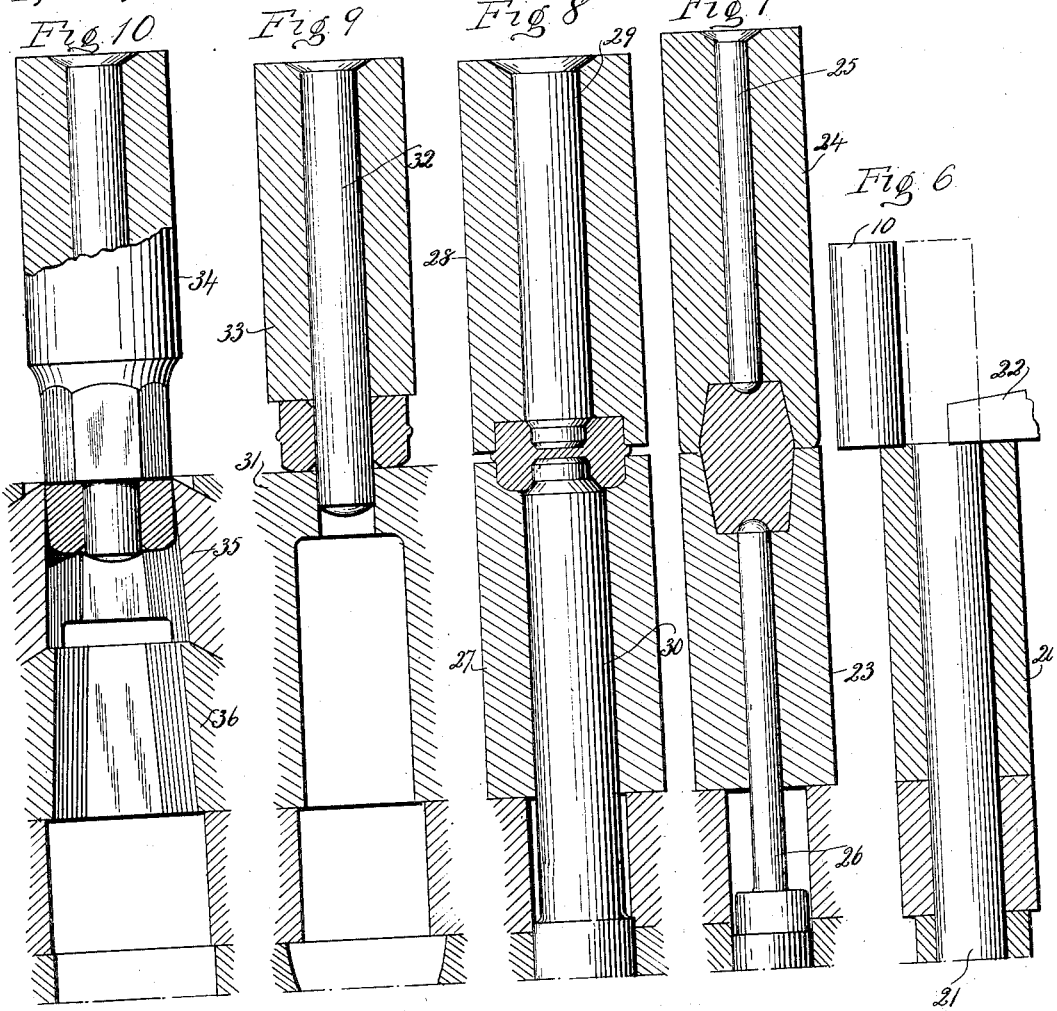
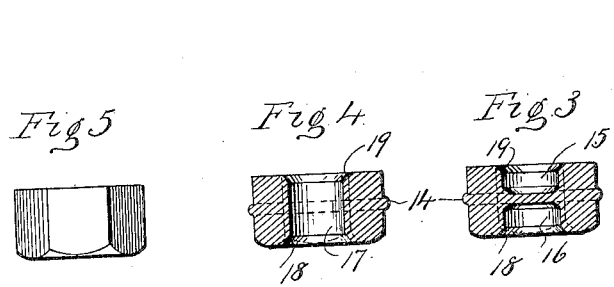
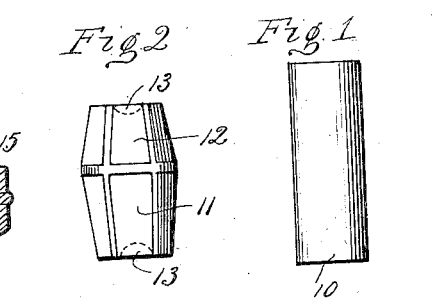

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

METHOD FOR FORMING NUTS.

1,408,917.

Specification of Letters Patent. Patented Mar. 7, 1922.

Application filed November 7, 1918, Serial No. 261,542. Renewed May 27, 1921. Serial No. 473,048.

*To all whom it may concern:*

Be it known that I, RICHARD LESTER WILCOX, a citizen of the United States, and a resident of Waterbury, county of New Haven and State of Connecticut, have invented certain new and useful Improvements in Methods for Forming Nuts, of which the following is a specification.

My present invention relates to improvements in methods for making nuts of any desired shape.

Heretofore the making of nuts which may have any cross section but which are usually square or hexagonal, has been accompanied by considerable waste of material, particularly when nuts of the larger sizes are to be formed and also particularly when nuts having a finished exterior are desired.

In some of the methods in which the least waste of material occurs, it is found that the nuts are relatively weak and are subject to splitting because of the direction in which the blank material has been rolled before the nuts are formed from it. In other methods, the nuts are formed from appropriately shaped square or hexagon bars, but this method involves expense in forming the original bars and besides, waste is involved in cutting the bar into lengths for the nuts.

One of the objects of my invention is to provide a method for forming nuts in which there will be a minimum waste of material. Another object of my invention is to form a nut which will be of great strength. With these and other objects in view, my invention consists of certain steps which will be more fully explained hereinafter and pointed out in the appended claims.

For purpose of illustration I have adopted the forming of a hexagon nut of the usual type as illustrative of the manner in which my method is to be applied.

Referring to the drawing, in which like numerals of reference designate like parts in the several figures;

Figure 1 illustrates one form of the blank used in my new method;

Figures 2 to 5, inclusive, illustrate this same blank after the successive operations thereon, Figure 5 being the finished nut;

Figure 6 illustrates mechanism for cutting off a blank from a wire length; and

Figures 7 to 10, inclusive, illustrate sets of tools with the blank therein, by which the several operations of my new method may be performed.

In the drawings 10 (Fig. 1) represents the original blank. This blank is of relatively small diameter as compared with the finished diameter of the nut, and of considerably greater length than the thickness of the nut as will be seen by a comparison of Figs. 1 and 5, the latter showing the finished nut made from the blank 10. Preferably, I form the blank by shearing it from wire of the proper diameter, because such shearing involves no loss of material whatever and wire is the most readily available form of material but the blank, however, may be of cast metal if desired.

In Fig. 2 is shown the blank after having been subjected to the first step of the preferred form of my method. In this figure, the blank has been coned from each end so that the blank is now made up of two frustums of pyramids 11 and 12 placed base to base. For certain purposes, such as convenience of manufacture I preferably make one of these frustums longer than the other, as shown in Fig. 2. Also preferably, as the blank of Fig. 2 is formed in appropriate dies, I also form a depression in either end of the blank, as indicated in dotted lines at 13, 13.

In Fig. 3, the blank is shown after having been compressed to complete the external shape of the rough blank. A fin 14 may be and frequently is left on the exterior of the blank after completion of this operation. While the shape of Fig. 3 is being made from that of Fig. 2, I also compress and push aside the metal in the interior so as to form a pair of openings 15, 16 extending into the nut blank from either end but preferably not meeting. Preferably, at the same time I also countersink the holes 15, 16 by appropriately shaping the tools which form such holes.

After the blank is shaped, as in Fig. 3, the holes 15, 16 are pierced so as to remove the metal between them and also to give the correct size to the hole 17, which now extends through the nut. This hole 17 will be of the proper size for the tap by which the nut is ultimately to be threaded.

I now trim the exterior of the nut in any appropriate way as, for instance, by forcing them through trimming dies. As thus trimmed, the nut is shown in Fig. 5.

As a last step, the nut is tapped in the usual way and by virtue of countersinking at 18, 19, the burr which is ordinarily thrown up by the tap is avoided, so that it is not necessary to remove such burr when finishing the upper and lower faces of the nut. If the nut were not countersunk at 18, 19, as shown, this burr would be thrown up above the surface of the nut, necessitating the facing of the nuts to remove this burr.

While preferably I begin the forming of the polygonal shape in the coning operation of Fig. 2, as shown in the drawings, it will be obvious that this is not essential. The blank may be coned so that the blank of Fig. 2 will consist of two frustums of cones, base to base, while Figs. 3 and 4 will be circular in cross section instead of polygonal. The polygonal shape will then be given in trimming the blank of Fig. 4 to form the shape of Fig. 5. While preferably I cone the blank 10 so as to insure the easy flow of the material into the desired shape, for some purposes, and particularly for some shapes, such coning operation will be unnecessary and the blank may be formed at once into the desired external shape.

It will be seen that, by my improved method, the only metal which is wasted is the small amount remaining between the holes 15, 16 and the amount which will be trimmed from the exterior of the blank. Moreover, by reason of the compression of the material in the forming operation, a nut of great strength will have been formed, because the metal has been compressed in being forced to flow into the new shape.

While I have shown the formation of a hexagon nut for purpose of illustration, it will be understood that any other desired shape may be produced in a similar manner by appropriately shaped tools.

While the tools necessary to cut off the blank or to perform other operations of my invention constitute no part thereof, I have, however, illustrated one form or set of such tools as will answer the purpose, this showing by drawing and specification being incorporated merely for the purpose of illustration.

In Figure 6 the numeral 20 designates the die, 21 the wire length therein, and 22 a cutter that moves by any convenient mechanism at right angles to the axis of the wire length and successively cuts off portions thereof to produce a blank which by my improved method is formed into a nut, one of such blanks being shown in said figure.

In Figure 7 the two dies are respectively designated 23 and 24, between which is shown a cross section of a blank illustrated in Figure 2, the depressions 13 in the opposite ends thereof being produced by the punches 25 and 26.

In Figure 8 the dies are respectively designated 27 and 28, the openings 15 and 16 in the blank being respectively formed by the punches 29 and 30.

In Figure 9 the die is designated by the reference numeral 31 and the punch by the reference numeral 32, this latter punch being connected with the die 33, and produces the blank shown in Figure 4.

In Figure 10 the punch is designated by the reference numeral 34 and the die by the reference numeral 35, which latter die may be, if desired, associated with the second die 36, whereby as the nuts are forced therethrough they are given a subsequent shearing cut.

In the drawings, for convenience, the tools performing the successive operations are shown directly above the blank as produced thereby and the blank is carried automatically from one set of tools to the next set of tools by fingers or carrying devices, or may be fed to each of the successive operations by hand, if desired.

What I claim as new and desire to secure by Letters Patent, is:—

1. The method of forming a polygonal nut from a blank which comprises coning the blank from each end and, at the same time giving the blank a section crudely approximating the shape of the finished nut, then completing the external formation of the rough nut in compression tools and, at the same time, forming a central hole in the blank at each end with the edges of the holes countersunk, leaving a portion of the metal between the ends of the holes, then removing the metal between the holes to form a central opening through the blank, then trimming the blank to the size and shape of the finished nut and finally tapping the blank.

2. The method of forming a polygonal nut from a blank which comprises coning the blank from each end, then completing the exterminal formation of the rough nut in compression tools and at the same time forming a central hole in the blank at each end with the edges of the holes countersunk, leaving a portion of the metal between the ends of the holes, then removing the metal between the holes to form a central opening through the blank, then trimming the blank to the size and shape of the finished nut and finally tapping the blank.

3. The method of forming a polygonal nut from a blank which comprises coning the blank from each end, then completing the external formation of the rough nut in compression tools and at the same time, forming a central hole in the blank at each end, leaving a portion of the metal between the ends of the holes, then removing the metal between the holes to form a central opening through the blank, then trimming the blank to the size and shape of the finished nut and finally tapping the blank.

4. The method of forming a nut which comprises the application of compression tools to each end of a blank that is of greater length than the thickness of the finished nut, whereby the cross-sectional area and the length of the blank is caused to approximate that of the finished nut, and at the same time forming a central hole in the blank at each end, with a portion of the metal interlined between the ends of the holes and then removing said interlined metal and trimming the blank to the size and shape of the finished nut.

5. The method of forming a polygonal article from a cylindrical blank which comprises the application of pressure in a plane parallel to the end of the blank, thereby completing the external formation of the article in rough and during such compression forming a central hole in the blank at each end, leaving a portion of the metal between the ends of the holes, then removing the metal between the holes to form a central opening through the blank, and then trimming the blank to the size and shape of the finished article.

6. The method of forming a nut which comprises the application of compression tools to each end of a blank that is of greater length than the thickness of the finished nut and at the same time forming a central hole in each end, with a portion of the metal interlined between the ends of the holes and then removing said interlined metal and trimming the blank to the size and shape of the finished nut.

7. The method of forming a nut which comprises the application of compression tools to each end of a blank and forming a central hole in each end thereof, with a portion of the metal interlined between the ends of the holes, then removing said interlined metal and trimming the blank to the size and shape of the finished nut.

8. The method of forming a polygonal article from a cylindrical blank which comprises the application of pressure in a plane parallel to the end of the blank and forming a central hole in each end thereof, leaving a portion of the metal between the ends of the holes, then removing the metal between the holes to form a central opening through the blank and then trimming the blank to the size and shape of the finished article.

RICHARD LESTER WILCOX.